Jan. 8, 1963     G. R. ANDERSON ET AL     3,072,163
FRUIT PREPARATION MACHINE
Filed March 14, 1960     4 Sheets-Sheet 3
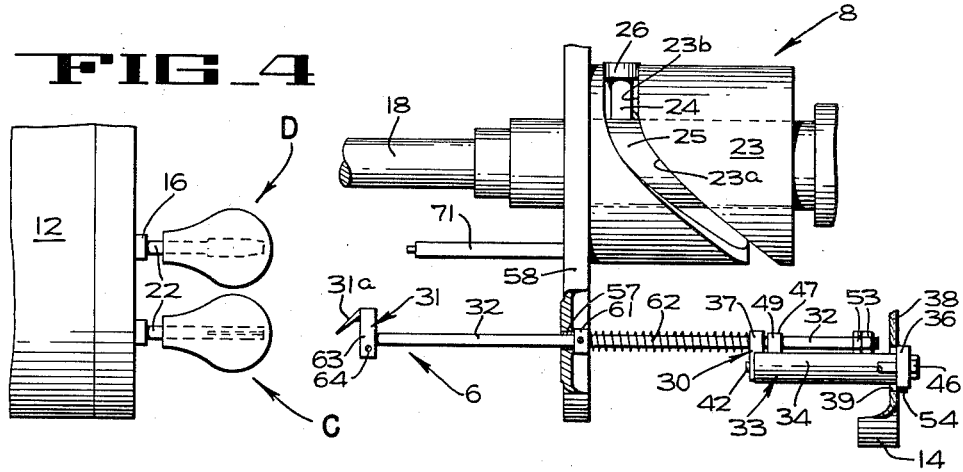
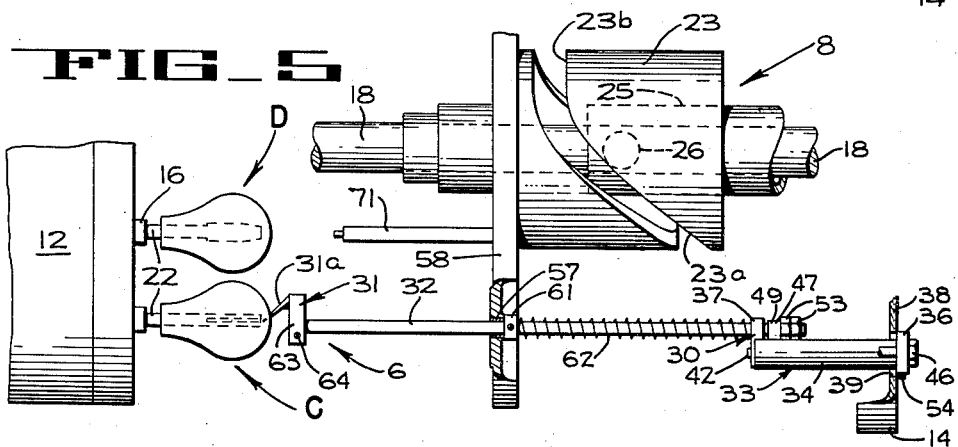
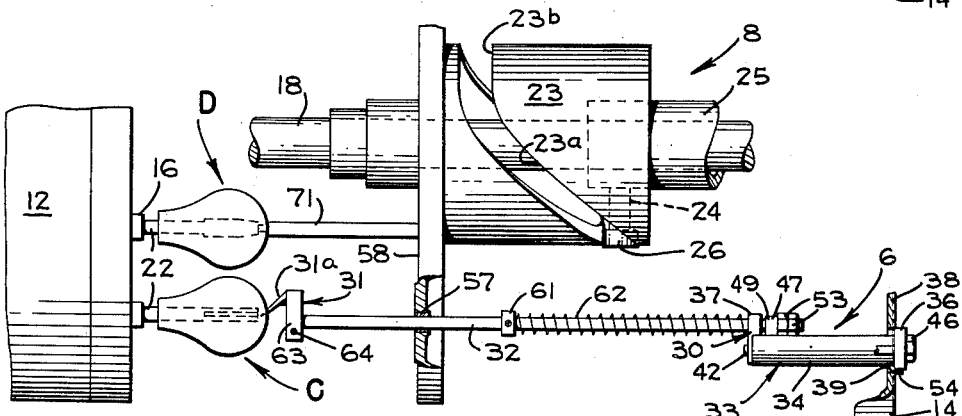
INVENTORS
GERALD R. ANDERSON
SHERMAN H. CREED
BY *Hans G. Hoffmeister*
ATTORNEY Jan. 8, 1963  G. R. ANDERSON ET AL  3,072,163
FRUIT PREPARATION MACHINE
Filed March 14, 1960  4 Sheets-Sheet 4
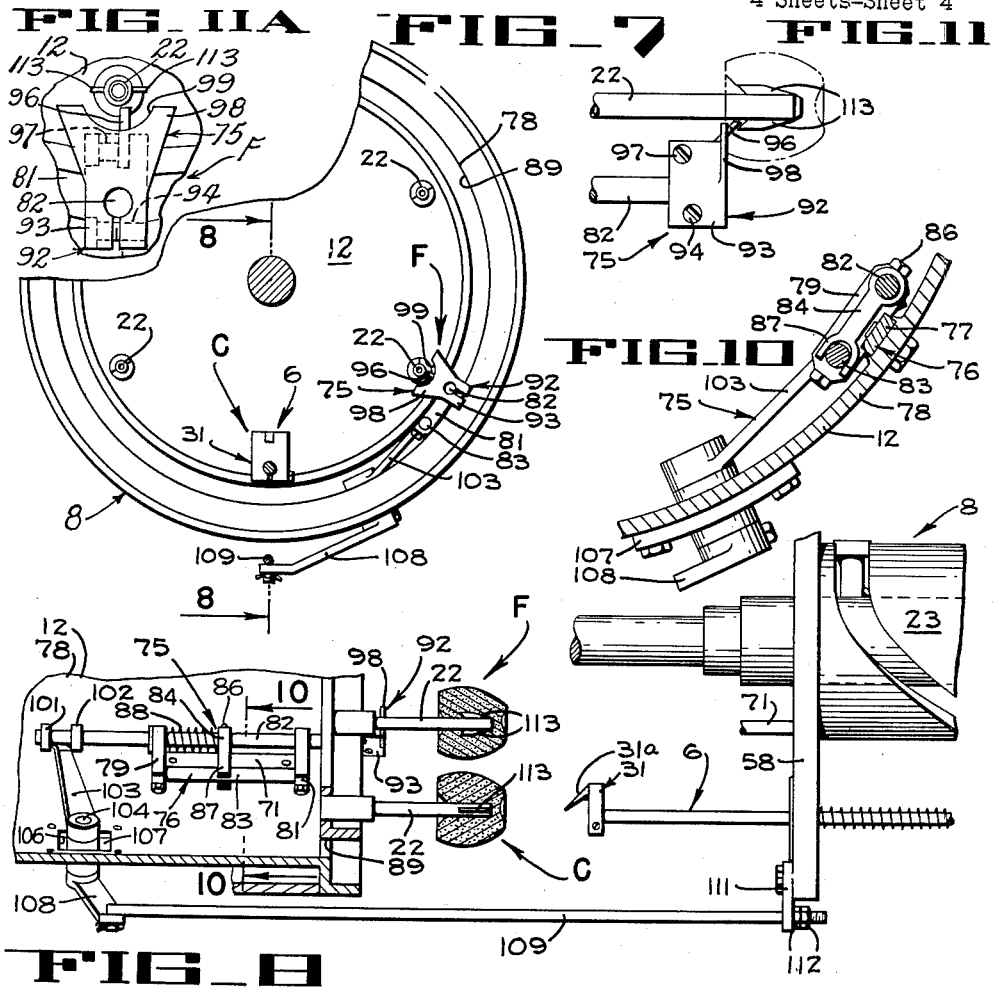
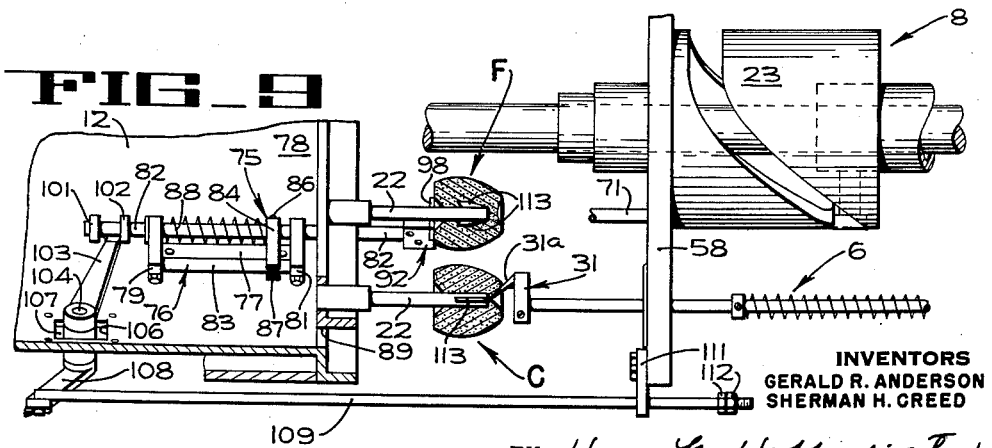
INVENTORS
GERALD R. ANDERSON
SHERMAN H. CREED
BY Hans G. Hoffmeister
ATTORNEY United States Patent Office 3,072,163
Patented Jan. 8, 1963

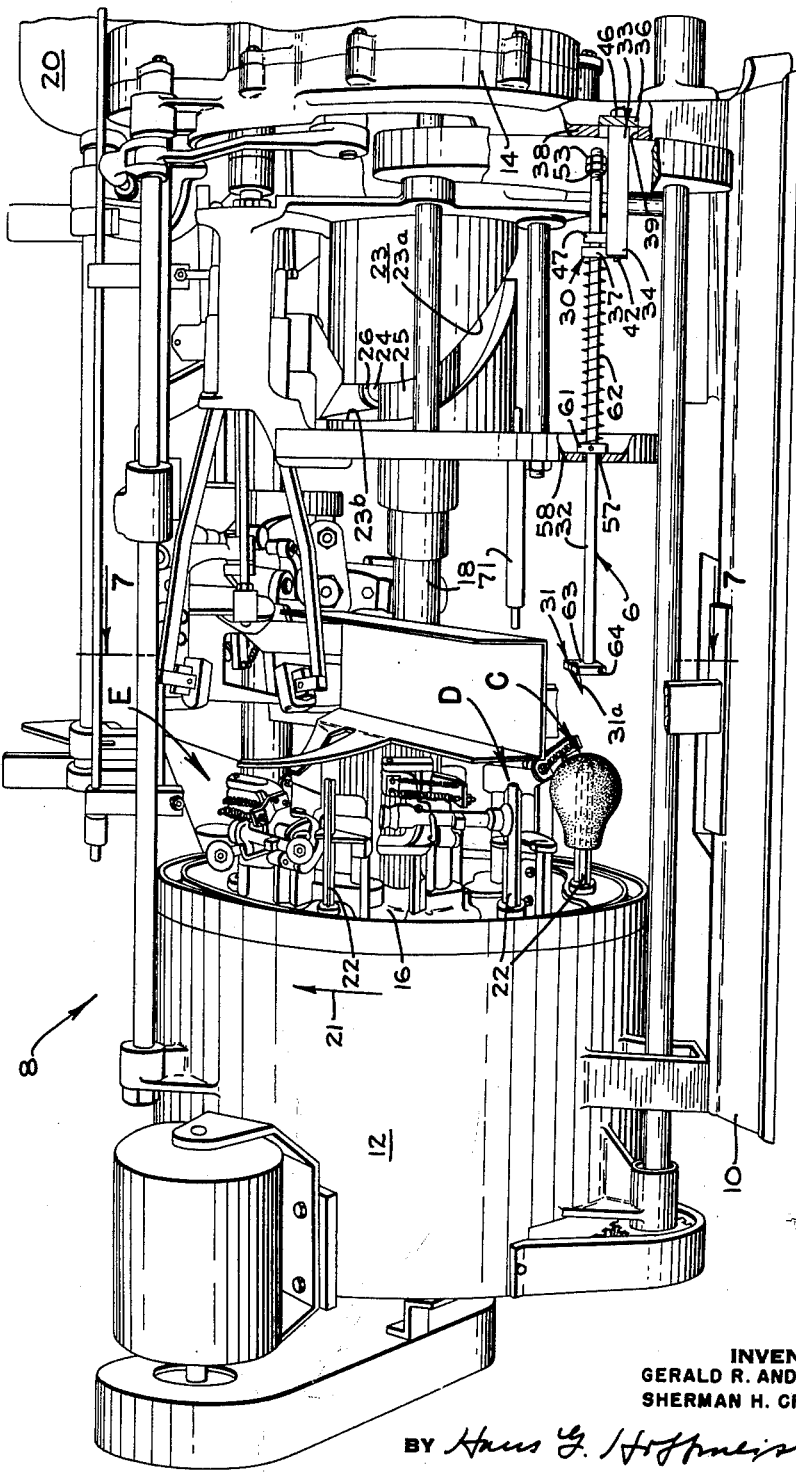

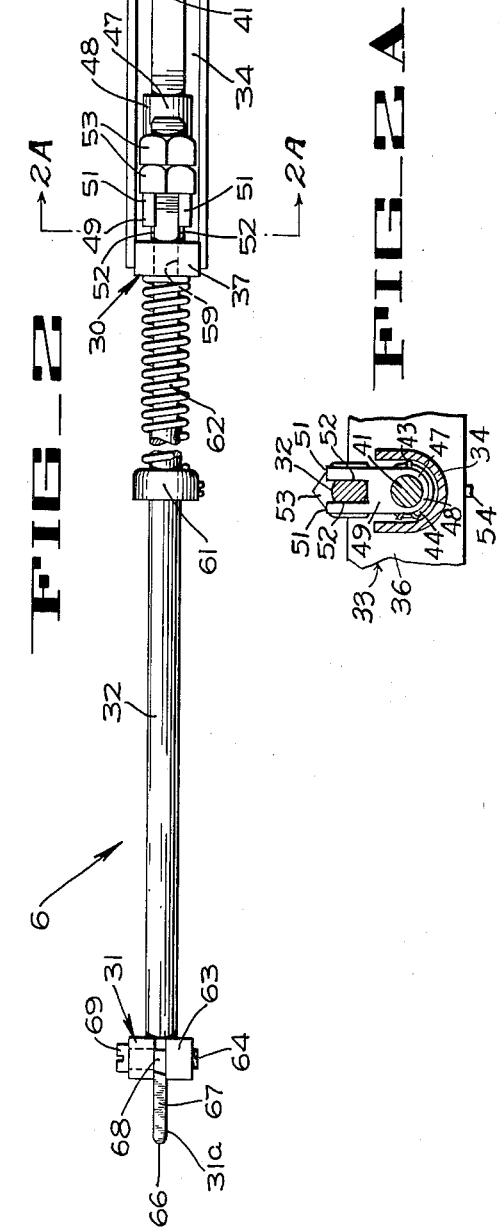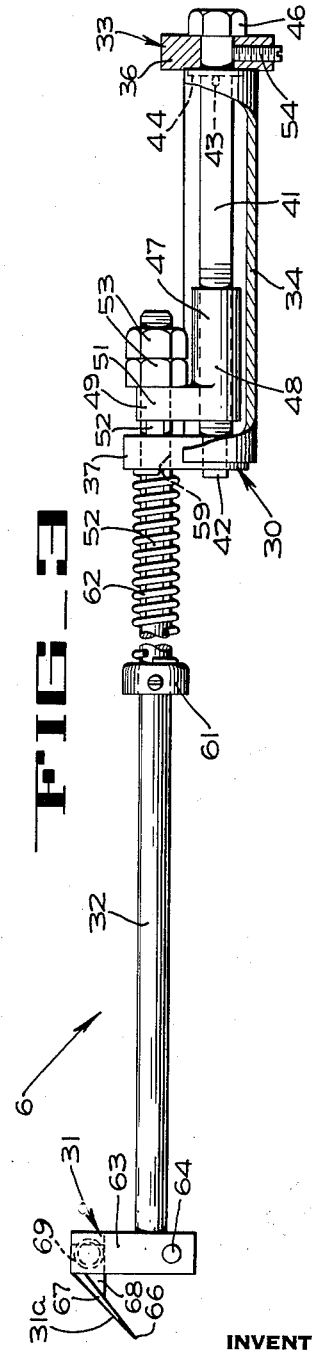

3,072,163
FRUIT PREPARATION MACHINE
Gerald R. Anderson, Campbell, and Sherman H. Creed, San Jose, Calif., assignors to FMC Corporation, a corporation of Delaware
Filed Mar. 14, 1960, Ser. No. 14,802
13 Claims. (Cl. 146—81)

The present invention appertains to a fruit preparation machine and more particularly relates to a fruit trimming apparatus for use in a machine for processing fruit such as pears, apples or the like.

One object of the present invention is to provide an improved calyx trimming apparatus for a fruit preparation machine.

Another object is to provide an improved device for adjusting the depth of cut of the calyx cutter of the trimming apparatus while the machine is in operation.

Another object is to provide a calyx trimming device having a cutter which is resiliently urged into a whole fruit.

Another object is to provide a stem indent trimming apparatus for timming the stem indent of fruit such as applies.

These and other objects and advantages of the present invention will become apparent from the following description and the accompanying drawing, in which:

FIG. 1 is a perspective of a pear preparation machine incorporating the calyx trimming apparatus of the present invention.

FIG. 2 is an enlarged fragmentary plan of the calyx trimming apparatus of the present invention.

FIG. 2A is a section taken along lines 2A—2A of FIG. 2.

FIG. 3 is a fragmentary elevation of the calyx trimming apparatus of FIG. 2, certain parts being cut away.

FIGS. 4, 5 and 6 are operational views showing the calyx trimming apparatus in three consecutive operative positions.

FIG. 7 is a diagrammatic vertical section of a portion of the machine when used to process apples, taken in the direction of the arrows 7—7 in FIG. 1 and showing the positions of the stem indent trimming apparatus and the calyx trimming apparatus.

FIG. 8 is a fragmentary vertical section of the machine of FIG. 7 taken along line 8—8 in FIG. 7, certain parts being removed to clearly show the apparatus of the present invention.

FIG. 9 is a view similar to FIG. 8 showing the apparatus in a different operative position.

FIG. 10 is an enlarged section taken along line 10—10 in FIG. 8.

FIG. 11 is an enlarged view showing the position of the cutting head of the stem indent trimming apparatus when it has moved to the forward end of its stroke.

FIG. 11A is an enlarged end elevation showing the cutting head of FIG. 11 with the stemming tube rotated 90°.

The calyx trimming apapratus 6 (FIG. 1) of the present invention is an improved device intended for use in a fruit preparation machine 8 of the type disclosed in the application of Sherman H. Creed et al. Serial No. 715,805, now U.S. Patent No. 2,984,274 issued May 16, 1961 which is assigned to the assignee of the present invention. The fruit preparation machine 8 comprises a rigid base 10 upon which are mounted opposite end standards 12 and 14. A turret 16, disposed in the end standard 12, is fixed to a horizontal shaft 18 which extends longitudinally of the machine 8 and is journalled for rotation in the end standards 12 and 14. A suitable transmission (not shown) interconnects the shaft 18 and a motor 20 so that the turret 16 will be intermittently rotated in one-sixth of a revolution increments in the direction indicated by the arrow 21 (FIG. 1).

The turret 16 is provided with a plurality of equally spaced stemming tubes 22 which project axially therefrom toward the standard 14. During operation of the machine, a fruit, which has had its stem end trimmed from its body, is then impaled, stem-end first, along its stem-blossom axis on one of the stemming tubes 22 each time a stemming tube 22 is indexed to the feed station (not shown) as fully described in the Creed et al. application. The parts (not shown) of the impaling apparatus, which transfer the fruit onto the impaling tubes, are rapidly reciprocated longitudinally of the machine 8 by a cylindrical cam 23 which is mounted on and slides longitudinally along the shaft 18. The cylindrical cam 23 (FIG. 4) is slid back and forth along shaft 18 by means of an arm 24 which is secured to a continuously rotating sleeve 25 and has a roller 26 movable along a cam slot 23a formed in the cam 23. When the roller 26 is moving along a dwell portion 23b of the cam slot, the cam is retained in the retracted position adjacent the standard 14 as shown in FIG. 1 during a substantial portion of a single revolution of the arm 24 with sleeve 25. When the roller 26 leaves the dwell portion 23b, the cam 23 is rapidly reciprocated along the shaft 18 during the remaining portion of each revolution of the arm 24 with little or no dwell at the extended point of its travel. The arm 24 is continuously rotated with sleeve 25 and is moved through one complete revolution once for each intermittent motion of the turret 16 by drive means (not shown). As mentioned above, each fruit is impaled, in its turn, upon one of the stemming tubes 22 at the feed station, and is then advanced in steps of one-sixth revolution increments from the feed station to the discharge station E (FIG. 1). During a portion of its travel between the feed station and the discharge station E, each fruit is rotated about the axis of its supporting stemming tube 22 as the tube is rotated by drive means described in the above-mentioned Creed et al. application.

While each stemming tube is being rotated, the fruit supported thereon is peeled by a peeler which removes all the peel from each fruit except for a small amount of peel surrounding the calyx of pears, when pears are being processed, and a small amount of peel surrounding the calyx and the stem indent of apples, when apples are being processed. The calyx trimming apparatus 6 of the present invention is arranged to remove this small amount of peel surrounding the calyx from a pear without injury to the pear while the pear is whole and is being processed at station C (FIG. 1). While at station C, each stemming tube 22 and the pear supported thereby rotate about their longitudinal axes.

The calyx trimming apparatus 6 comprises a depth control device 30 (FIGS. 1, 2 and 3), a cutter head 31 with its cutter 31a, and a rod 32 interconnecting the cutter adjusting device 30 and the cutter head 31. The cutter adjusting device 30 comprises a T-shaped bracket 33 (FIG. 2) having an elongated U-shaped body 34 welded to a mounting plate 36 at one end and to a guide plate 37 at the other end. The plate 36 is bolted to a flange 38 (FIG. 1) of the standard 14 with the U-shaped body 34 projecting through an opening 39 in the flange 38. An elongated adjustment bolt 41 (FIG. 3) has a reduced diameter unthreaded terminal end 42 journalled in a hole in the plate 37, while its other end is journalled in a hole in the plate 36. The bolt 41 is held from axial movement by a pin 43 and a thrust washer 44 disposed on one side of the mounting plate 36, and the head 46 of the bolt 41 disposed on the other side of the mounting plate 36.

An L-shaped adjustment member 47 (FIG. 3) is disposed between the plates 36 and 37 and includes an internally threaded body 48 which receives the bolt 41. An upwardly directed actuating arm 49 of the adjustment member 47 has a forked upper end portion 51 arranged to receive a portion of the rod 32 which has opposed flattened surfaces 52 that are disposed in such a manner that the rod 32 may slide axially of, but is prevented from rotation relatively to, the end portion 51. Lock nuts 53 are screwed on the end of the rod 32 and are arranged to terminate movement of the rod 32 to the left (FIG. 3) when one of the nuts 53 is moved into engagement with the actuating arm 49. It will be evident, therefore, that rotation of the bolt 41 in a direction which will move the adjustment member 47 to the right (FIG. 3) will decrease the depth of cut of the cutter 31a, and rotation of the bolt in the opposite direction will increase the depth of cut of the cutter 31a. A set screw 54 is screwed into a threaded opening in the mounting plate 36 against the bolt 41 when it is desired to lock the bolt in adjusted position.

The rod 32 is guided and maintained in axial alignment with each stemming tube 22, when each stemming tube 22 is at station C (FIG. 1), by the cooperation of a bushing 57 in a cam plate 58 and by a hole 59 in the guide plate 37. The cam plate 58 is connected to the cylindrical cam 23 and is reciprocated with the cam longitudinally of the shaft 18. A collar 61 is rigidly secured to the rod 32 and a spring 62 is disposed between the collar 61 and the guide plate 37 and urges the rod 32 towards the left as viewed in FIG. 1.

The cutter head 31 comprises a split block 63 (FIGS. 2 and 3) which is locked on the end of the rod 32 adjacent the stemming tube 22 by a bolt 64. The cutter blade 31a is angled toward the fruit and includes a sharpened point 66, a sharpened cutting edge 67, and a mounting shank 68. The shank 68 is secured in a slot in the split block 63 by a bolt 69. The point 66 of the cutter blade 31a enters the calyx end of the rotating pear at a point which is adjacent to the axis of rotation of the stemming tube 22. The depth of cut is controlled by the adjustment bolt 41 which is set to allow the point 66 to enter the pear to a depth such that the point 66 is close to the free end of the stemming tube 22 when it is at station C. Thus, the stationary cutter 31a makes a clean circular cut in the rotating pear which separates the calyx material from the peeled body of the rotating pear.

As described in the Creed et al. application, a portion of the stem material, which is connected to the stem material within the stemming tube 22, may project out of the stemming tube 22 (FIG. 1). Any such material is pushed into the tube 22 at station D by a pusher 71 which is secured to and is actuated by the cam plate 58.

The operation of the calyx trimming apparatus 6 of the present invention, when used for processing pears, will be described in connection with FIGS. 4, 5 and 6. A pear on one of the stemming tubes 22 is indexed to station C (FIG. 4) with the pear being rotated by its rotating stemming tube 22 and with the cutter 31a being held away from the pear by the cam plate 58 which is in its retracted position. As the continuously driven arm 24 rotates, the cam plate 58 and the cutter 31a are first advanced approximately half the cam stroke towards the stemming tube 22 as indicated in FIG. 5. At this point in the travel of the cutter 31a, the cutter enters the pear and shortly thereafter one of the lock nuts 53 contacts the actuating arm 49 of the adjustment member 47 to prevent further movement of the cutter toward the stemming tube 22. It will be noted that the spring 62 resiliently forces the cutter 31a into the rotating pear and that the cam plate 58 and arm 49 only control the positioning of the cutter 31a and resist the urging of the spring 62. By resiliently forcing the cutter 31a into the pear, as compared to positively forcing the cutter into the pear at a constant rate and with a predetermined stroke, the cutter 31a is advanced into a pear at a rate which permits the cutter to cleanly cut the pear and not crush or tear it. The cam 23 and the cam plate 58 then move to the position shown in FIG. 6 thereby completing their forward stroke without affecting the position of the cutter 31a. At approximately the mid-point of the return stroke of the cam 23, the cam plate 58 contacts the collar 61 and then returns the cutter 31a to the starting position as shown in FIG. 4. It is to be noted that the cutter 31a remains in contact with the pear during the second half of the forward stroke of the cam 23 and also during the first half of the return stroke of the cam 23, thereby allowing ample time for the pear to rotate one complete revolution while being contacted by the cutter 31a.

After being trimmed at station C, the pear is then advanced by the turret 16 to station D where, upon the next actuation of the cam 23, the pusher 71 pushes any portion of the stem material which may project out of the stemming tube 22 into the stemming tube 22 to thereby complete the calyx trimming operation.

From the foregoing description it is apparent that the calyx trimming apparatus of the present invention provides a clean cut around the calyx of a pear since the cutter is resiliently urged into the pear, and for this reason establishes a feed rate which will not crush or tear the surface of the pear. It is also apparent that the calyx trimming apparatus includes a device for controlling the position of the cutter relative to the end of the stemming tube while the fruit preparation machine is operating.

When processing apples with the fruit preparation machine 8, the calyx is trimmed with the apparatus 6 in the same manner as above described in connection with processing of pears. However, since apples are indented adjacent the stem end, a stem indent trimming apparatus 75 (FIGS. 7–11) is also provided to trim this portion of apples and is positioned in the end standard 12 of the machine at station F (FIG. 7).

The stem indent trimming apparatus 75 comprises a bracket 76 (FIGS. 8, 9 and 10) which includes a rectangular bar 77 bolted to the curved wall 78 of the end standard 12, and shaft guide blocks 79 and 81 welded to opposite ends of the bar 77. The blocks 79 and 81 are apertured to slidably receive a cutter supporting shaft 82 and a guide rod 83 which is locked to the blocks 79 and 81 by any suitable means such as by set screws. In order to hold the shaft 82 from rotation, an arm 84 is rigidly connected to the shaft 82 by a set screw 86 and has a lower forked end 87 which straddles the fixed guide rod 83. A compression spring 88 is disposed between the block 79 and the arm 84 and urges the shaft 82 toward the apple carried by the associated stemming tube 22.

The shaft 82 projects through an annular opening 89 (FIG. 8) formed between the end standard 12 and the turret 16. A cutter head 92 (FIG. 7) is mounted on the free end of the cutter supporting shaft 82 and includes a split block 93 (FIG. 11) which is locked on the shaft 82 by a bolt 94. A cutter 96, which is similar to the cutter 31a (FIG. 3), is secured to the split block 93 by a bolt 97 and projects outwardly therefrom toward the axis of the associated stemming tube 22. A flat gauge plate 98 is secured, as by bolting, to the split block 93 in position to engage the apple to be trimmed. The radially inner edge 99 of the gauge plate 98 is arcuately formed (FIG. 7) to permit the cutter 96 to project therethrough as shown in FIG. 11.

A pair of spaced collars 101 and 102 (FIGS. 8 and 9) are secured on the other end of the cutter supporting shaft 82 and receive one end of an actuating lever 103 therebetween. The other end of the lever 103 is secured to a stub shaft 104 which projects through an opening 106 in the curved wall 78 of the end standard 12 and is journalled in a bracket 107 bolted to the wall 78. Another lever 108 is secured to stub shaft 104 externally of the curved wall 78 and has one end of an actuating rod 109 connected thereto. The other end of the rod 109 projects through an opening in a bracket 111 bolted to the cam plate 58. A pair of lock nuts 112 are screwed on the rod 109 and engage the bracket 111 to pivotally actuate the levers 103 and 108 to withdraw the cutter head 92 from the fruit as shown in FIG. 8. It will be recognized that the cutter head 31 of the calyx trimming apparatus 6 is also withdrawn from the fruit at this time thereby permitting the stemming tubes 22 and supported fruit to be indexed without interference from the cutter heads 31 and 92.

When the cam 23 and cam plate 58 move to their foremost positions as indicated in FIG. 9, the cutter 31a of the calyx trimming apparatus trims the calyx of the apple at station C in the same way as previously described in relation to trimming the calyx of pears. As the cutter 96 of the stem indent trimming apparatus enters the apple, the lock nuts 112 become spaced from the bracket 111. This occurs as the cam plate 58 approaches the midpoint of its forward stroke. The spring 88 of the apparatus 75 forces the cutter 96 into the rotating apple at station F to trim the stem indent to a depth determined by the gauge plate 98 as it contacts the flattened stem-end of the apple. If an apple is not present at station F, the collar 102 will contact the block 79 to limit the amount of movement of the cutter 96 toward the free end of the stemming tube 22 as indicated in FIG. 11. This will prevent the cutter 96 from contacting vanes 113 on the free end of the stemming tube 22.

At approximately the mid-point in the return stroke of the cam 23, the nuts 112 contact the bracket 111 to return the cutter head 92 to its retracted position as shown in FIG. 8. It will be realized, therefore, that the cutter 96 engages the apple during approximately half of the stroke of the cam 23 and, hence, the apple can easily complete one revolution while being contacted by the cutter 96.

The calyx trimming apparatus 6 and the stem indent trimming apparatus 75 of the present invention have been described in connection with the Creed et al. machine wherein each fruit has its stem material removed as it is being moved onto one of the stemming tubes 22. It is within the scope of the invention, however, to substitute solid fruit supporting rods for the stemming tubes 22 and to remove the stem material from the fruit before the fruit is transferred onto the fruit supporting rods. With this arrangement the pusher 71 will be eliminated and the cutter 31a will be shortened so that it will extend only to the outer periphery of the supporting rods.

It is apparent from the above description that when processing apples, both ends of the fruit are trimmed by the calyx trimming apparatus and the stem indent trimming apparatus which operate simultaneously on apples at different stations to trim the area around the calyx and stem, respectively. The cutter which trims the stem end enters the apple to a depth determined by the gauge plate thereby uniformly trimming the stem end of each apple. Also, the cutter is resiliently urged into the apple to provide a clean cut without injury to the apple.

While two embodiments of the present invention have been shown and described, it will be understood that various changes and modifications may be made without departing from the spirit of the invention or the scope of the appended claims.

The invention having thus been described, what is believed to be new and desired to be protected by Letters Patent is:

1. A fruit trimming apparatus comprising a fruit support, a cutter, means mounting said cutter for reciprocating movement toward and away from the fruit being processed on said fruit support, means included in said mounting means for limiting the movement of said cutter to said movement toward and away from the fruit, a cam operatively connected to said mounting means for moving a portion of said mounting means toward and away from the fruit, resilient means connected to said mounting means for urging said cutter toward said fruit, said portion of said mounting means being arranged to resist the urging of said resilient means, adjustable abutment means operatively connected to said mounting means and arranged to limit the depth of cut of said cutter in the fruit, said abutment means being operable to adjust the depth of cut while said fruit trimming apparatus is being operated, and means for rotation said fruit support.

2. A fruit trimming apparatus comprising a cutter supporting rod, a cutter on one end of said rod, a stationary bracket slidably supporting said rod adjacent the other end thereof, a plate slidably supporting said rod adjacent the midpoint thereof, means for reciprocating said plate through a predetermined distance in a direction parallel to the longitudinal centerline of said rod, a collar secured to said rod, resilient means interposed between said collar and said stationary bracket for urging said collar against said slidable plate, a bolt journalled for free rotation in said bracket, means for holding said bolt from axial movement relative to said bracket, an arm secured to said bolt and having a forked end in sliding engagement with said rod, and an abutment secured to said other end of said rod and arranged to contact said arm to terminate movement of said rod prior to the completion of travel of said plate through said predetermined distance.

3. A fruit trimming apparatus comprising a cutter supporting rod, a cutter on one end of said rod, opposed flat surfaces on the rod adjacent the other end thereof, a stationary bracket slidably supporting said rod adjacent said other end, a plate slidably supporting said rod adjacent the midpoint thereof, means for reciprocating said plate through a predetermined distance in a direction parallel to the longitudinal centerline of said rod, a collar secured to said rod, resilient means interposed between said collar and said stationary bracket for urging said collar against said slidable plate, a bolt journalled for free rotation in said bracket, means for holding said bolt from axial movement relative to said bracket, an arm secured to said bolt and having a forked end in sliding engagement with said opposed flat surfaces on said rod to prevent rotation of said rod, and an abutment secured to said other end of said rod and arranged to contact said arm to terminate movement of said rod prior to the completion of travel of said plate through said predetermined distance, said bolt being adapted to be rotated to adjust the position of said arm longitudinally of said rod when the fruit trimming apparatus is being operated.

4. A calyx trimming apparatus for trimming the calyx end of a fruit being rotated about a predetermined axis comprising a plate, means connected to said plate for reciprocating said plate through a predetermined distance along a path parallel to said axis, a stationary mounting bracket adjacent said means, a rod slidably supported and maintained in alignment with said axis by said plate and said stationary mounting bracket, an abutment secured to said rod, resilient means disposed between said abutment and said stationary mounting bracket and arranged to urge said rod toward the fruit and to urge said abutment against said plate, a cutter secured on one end of said rod in position to enter the calyx end of the fruit, a nut secured to the other end of said rod, and adjustable abutment means carried by said stationary bracket and arranged to be contacted by said nut to terminate the movement of said rod and said cutter toward the fruit upon movement of said plate toward the fruit and before said plate travels through said predetermined distance.

5. A calyx trimming apparatus for trimming the calyx end of a fruit being rotated about a predetermined axis comprising a cam arranged to be reciprocated through a predetermined distance along a path parallel to said axis, a cam plate secured to said cam for reciprocable movement therewith, stationary mounting means adjacent said cam, a rod slidably supported and maintained in alignment with said axis by said cam plate and said stationary mounting means, a collar rigid in said rod and disposed between said cam plate and said stationary mounting means, a spring disposed between said collar and said mounting means and arrangeed to urge said rod towards the fruit, a cutter secured on one end of said rod and arranged to enter the calyx end of the fruit, a nut secured to the other end of said rod, and abutment means carried by said stationary mounting means and arranged to be contacted by said nut to terminate the movement of said rod and said cutter toward the fruit upon movement of said cam plate toward the fruit before said cam travels through said predetermined distance.

6. A calyx trimming apparatus for trimming the calyx of a fruit comprising an intermittently driven rotary turret, a tubular stemming tube carried by said turret for movement between a plurality of stations, means connected to said stemming tube to rotate the same about its longitudinal axis, a reciprocable rod in axial alignment with said axis, a cutter secured to one end of said rod and being offset from said axis, a stationary bracket slidably supporting the other end of said rod, a plate slidably supporting said rod intermediate its ends, means for reciprocating said plate through a predetermined distance along a path parallel to said axis once for each intermittent movement of said turret, a collar locked on said rod and disposed between said plate and said bracket, a spring disposed between said collar and said stationary bracket for urging said shaft toward a fruit on said stemming tube, and means for terminating the movement of said rod toward the fruit after said cutter enters the fruit to a desired cutting depth and before said plate travels said predetermined distance.

7. A calyx trimming apparatus for trimming the calyx of a fruit comprising an intermittently driven rotary turret, a tubular stemming tube carried by said turret for movement between a plurality of stations, means connected to said stemming tube to rotate the same about its longitudinal axis, a reciprocable rod in axial alignment with said axis, a cutter secured to one end of said rod and being offset from said axis, a stationary bracket slidably supporting the other end of said rod, a plate slidably supporting said rod intermediate its ends, means for reciprocating said plate through a predetermined distance along a path parallel to said axis once for each intermittent movement of said turret, a collar locked on said rod and disposed between said plate and said bracket, a spring disposed between said collar and said stationary bracket for urging said shaft toward a fruit on said stemming tube, means for terminating the movement of said rod toward the fruit after said cutter enters the fruit to a desired cutting depth and before said plate travels said predetermined distance, means for adjusting said terminating means while the trimming apparatus is being operated, and means carried by said plate and arranged to push stem material which projects out of said tubular stemming tube into said stemming tube when said stemming tube is moved to the next station and upon movement of said plate a second time through said predetermined distance.

8. A fruit trimming apparatus comprising a stemming tube for supporting a fruit and for rotating the fruit about a predetermined axis, a cutter supporitng block disposed adjacent the fruit, a gauge plate secured to said block in a plane normal to said axis and having an arcuate edge concentric with said predetermined axis, a cutter supported by said block and having a free end projecting outwardly of said edge to a point immediately adjacent said stemming tube, a shaft secured to said block, means for supporting said shaft for movement from a position in which said cutter and said gauge are spaced from the fruit to a position in which said cutter penetrates the fruit and said gauge plate rests against the fruit to establish the depth of cut of said cutter into the fruit, resilient means connected to said shaft to urge said cutter toward the fruit, actuating means movable toward and away from the fruit in a direction parallel to said axis, and means connecting said shaft to said actuating means and arranged upon movement of said actuating means in a predetermined direction to withdraw said cutter from the fruit against the urging of said resilient means.

9. A fruit trimming apparatus comprising a cutter, means for supporting and rotating a fruit in position to be engaged by said cutter, a shaft for supporting said cutter for movement toward and away from the fruit, a bracket slidably supporting said shaft, a guide rod secured to said bracket and disposed parallel to said shaft, an arm rigidly connected to said shaft and having a forked end straddling said rod to prevent rotation of said shaft, a lever connected to said shaft, a cam movable through a predetermined stroke toward and away from the fruit, and a linkage operatively connected between said lever and said cam and arranged to control the movement of said cutter toward the fruit while said cam is moving through the first half of its stroke toward the fruit and arranged to withdraw said cutter from the fruit while said cam is moving through the second half of its stroke away from the fruit.

10. A fruit trimming apparatus comprising means for supporting and rotating fruit about the stem-blossom axes of the fruit, a first cutter, means mounting said first cutter for movement from a position spaced from a fruit on said supporting means to a position in engagement with the blossom-end of the same fruit, means connected to said cutter mounting means for resiliently urging the cutter toward the fruit, a second cutter, means mounting said second cutter for movement from a position spaced from a fruit to a position in engagement with the stem-end of the associated fruit, means connected to said second cutter mounting means for urging said second cutter toward the associated fruit, a cam mounted adjacent said cutter for reciprocating movement toward and away from the cutters along a path parallel to the stem-blossom axes of the supported fruit, a cam plate secured to and extending transversely from said cam, means operatively connecting said first cutter mounting means to said cam plate, a lever connected to said mounting means for said second cutter, and a lost motion linkage operatively connecting said lever to said cam plate, said cam plate being adapted to simultaneously control the movement of said first and second cutter mounting means toward and away from the associated fruit.

11. In a fruit trimming apparatus, a rotary spindle for supporting a fruit, means for rotating said spindle, a gauge plate having a bifurcated end and a flat gauging surface disposed in a plane normal to the axis of said spindle, a cutter rigid with said gauge plate and disposed between the arms of the bifurcated end of said gauge plate, a shaft rigid with said gauge plate and disposed parallel to said spindle axis, means for supporting said shaft for movement parallel to said spindle axis from a position in which said cutter and said gauge are spaced from the fruit to a position in which said cutter penetrates the fruit and the flat surface of said gauge plate rests against the fruit to stop penetration of said cutter into the fruit, and resilient means connected to said shaft to urge said cutter and said gauge toward the fruit.

12. A calyx trimming apparatus for trimming the calyx end of a fruit being rotated about a predetermined axis comprising a plate, means connected to said plate for reciprocating said plate through a predetermined distance along a path parallel to said axis, a stationary mounting bracket adjacent said means, a rod slidably supported and maintained in alignment with said axis by said plate and said stationary mounting bracket, an abutment secured to said rod, resilient means disposed between said abutment and said stationary mounting bracket and arranged to urge said rod toward the fruit and to urge said abutment against said plate, a cutter secured on one end of said rod in position to enter the calyx end of the fruit, adjustable abutment means operably connected between said rod and said stationary bracket for terminating the movement of said rod and said cutter toward the fruit upon movement of said plate toward the fruit and before said plate travels through said predetermined distance.

13. A fruit trimming apparatus comprising means for supporting and rotating fruit about the stem-blossom axes of the fruit, a first cutter, means mounting said first cutter for movement from a position spaced from a fruit on said supporting means to a position in engagement with the blossom-end of the same fruit, means connected to said cutter mounting means for resiliently urging the cutter toward the fruit, a second cutter, means mounting said second cutter for movement from a position spaced from a fruit to a position in engagement with the stem-end of the associated fruit, means connected to said second cutter mounting means for urging said second cutter toward the associated fruit, actuating means mounted adjacent said first cutter for reciprocating movement toward and away from the cutters along a path parallel to the stem-blossom axes of the supported fruit, means operatively connecting said first cutter mounting means to said actuating means, and means operatively connecting said mounting means for said second cutter to said actuating means and including a lost motion linkage, said actuating means being adapted to simultaneously control the movement of said first and second cutter mounting means toward and away from the associated fruit.

References Cited in the file of this patent

UNITED STATES PATENTS

| | | |
|---|---|---|
| 1,448,532 | Harding | Mar. 13, 1923 |
| 2,901,014 | Coons et al. | Aug. 25, 1959 |